United States Patent [19]

Johnson

[11] Patent Number: 4,522,455
[45] Date of Patent: Jun. 11, 1985

[54] MODULAR ELECTRIFIED COVER PLATE

[76] Inventor: Richard H. Johnson, 3401 White Diamond, Prior Lake, Minn. 55372

[21] Appl. No.: 540,679

[22] Filed: Oct. 11, 1983

[51] Int. Cl.³ .............................................. H01R 19/46
[52] U.S. Cl. ............................... 339/14 R; 339/113 L; 339/123; 339/156 R
[58] Field of Search ............... 339/113 R, 113 L, 123, 339/147 R, 147 P, 156 R; 340/656, 687; 362/95; 337/197, 198

[56] References Cited

U.S. PATENT DOCUMENTS

| | | | |
|---|---|---|---|
| 1,720,463 | 7/1929 | Both | 339/113 L |
| 2,045,199 | 6/1936 | Petersen | 340/687 |
| 2,385,620 | 9/1945 | Fleckenstein | 340/687 |
| 2,449,150 | 9/1948 | Schnoll | 340/656 |
| 2,536,520 | 1/1951 | Tighe | 337/197 |
| 3,169,239 | 2/1965 | Lacey | 340/638 |
| 3,588,489 | 6/1971 | Gaines | 362/95 |
| 3,753,261 | 8/1973 | Thaxton | 340/687 |
| 3,924,914 | 12/1975 | Banner | 339/14 |

Primary Examiner—Neil Abrams
Attorney, Agent, or Firm—Donald A. Jacobson

[57] ABSTRACT

A cover plate for an electrical receptacle outlet contains electrical circuits with flexible fingers which extend adjacent to the receptacle contacts such that the cover plate circuits are connected to the receptacle circuits by the prongs of a plug whenever a plug is inserted into the receptacle. The opposite end of the plate circuits extend into two cavities within the plate each of which can hold a matching module. Each module has flexible electrical contacts which press against each of the plate electrical circuits extensions to provide a connection from the receptacle circuit to the modules. The outer face of the cover plate adjacent to one of the modules has an opening to provide a path for either light or acoustic energy. The modules can contain any desired electrical circuits which can provide such functions as circuit protecting elements, pilot lights, alarm systems and detector systems as desired with no external wiring required.

6 Claims, 4 Drawing Figures

U.S. Patent  Jun. 11, 1985  4,522,455
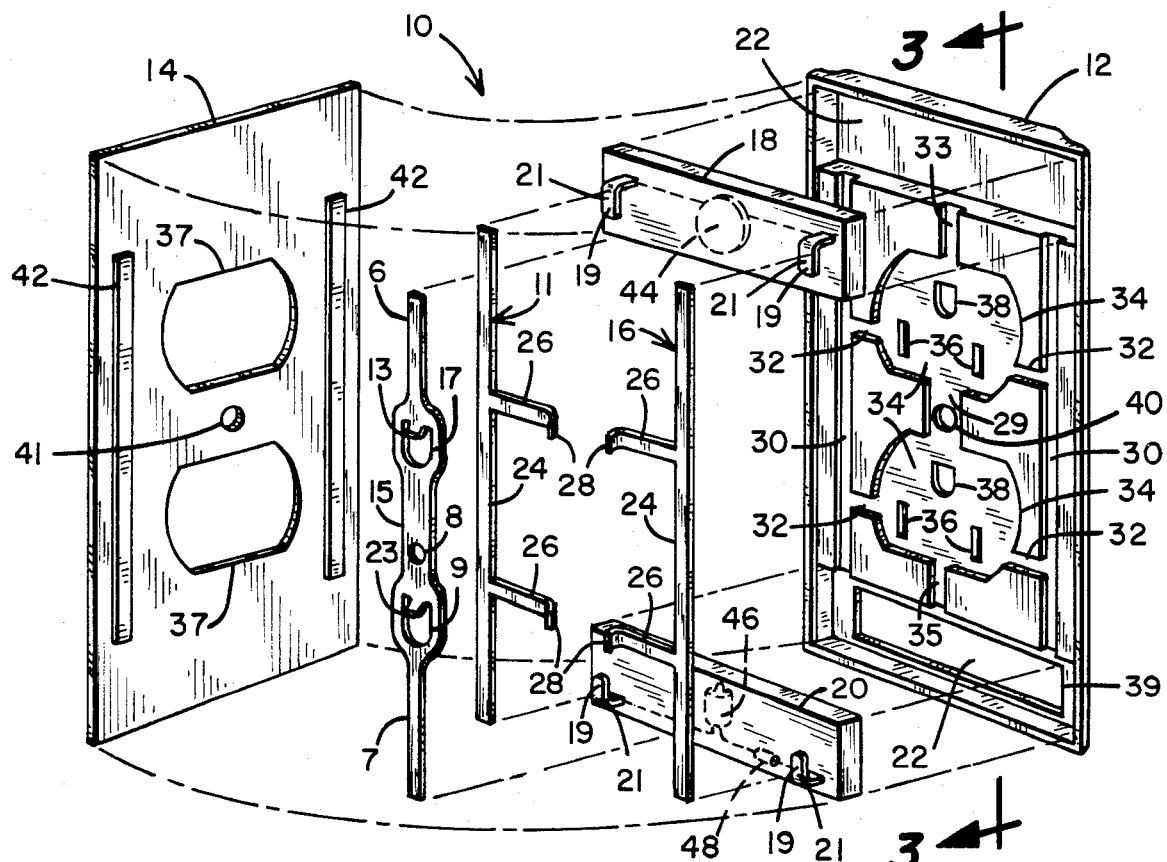
Fig. 1
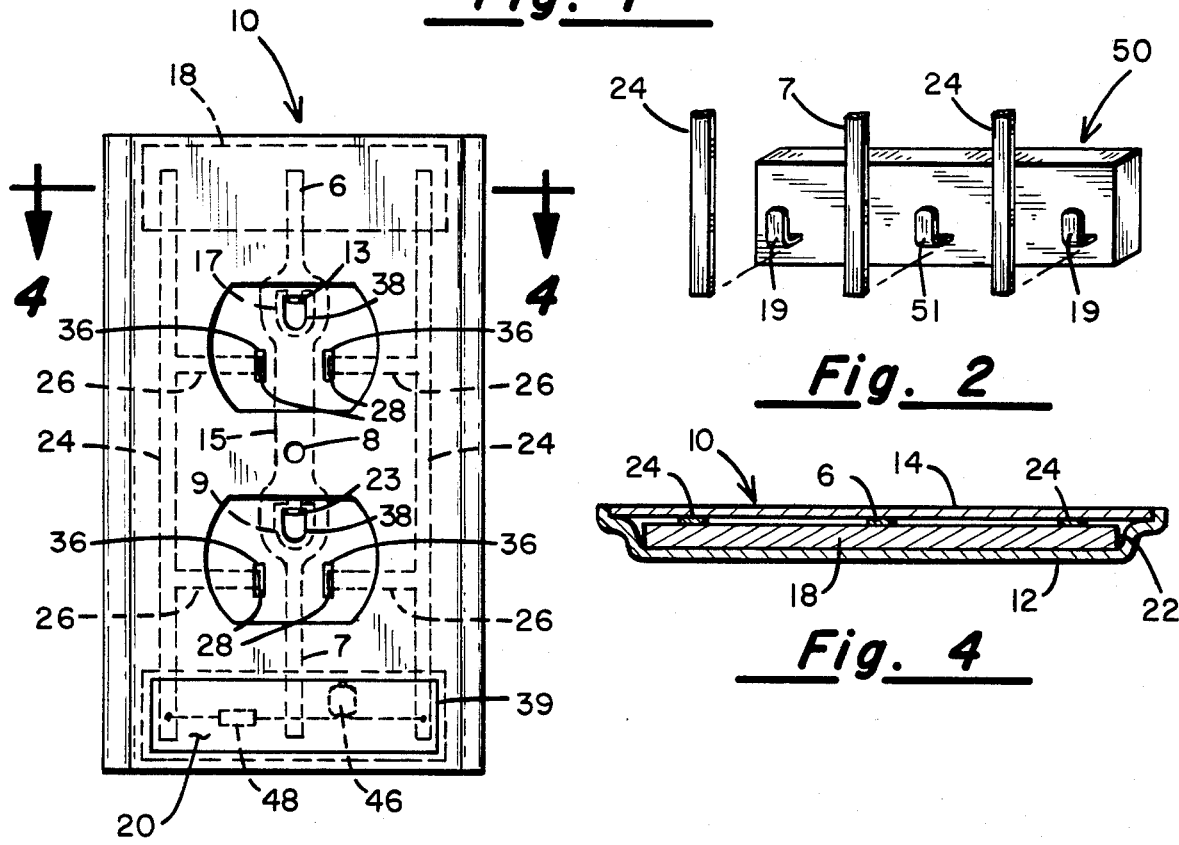
Fig. 2
Fig. 3
Fig. 4

MODULAR ELECTRIFIED COVER PLATE

BACKGROUND OF THE INVENTION

I. Field of the Invention

This invention relates to a modified cover plate for an electrical outlet which is electrified to provide electrical power to a module within a cavity, which can have a variety of electrical circuits.

II. Description of the Prior Art

There are a number of electrical outlet plates which are electrified to power certain electrical circuits which are attached to or made a part of the plate.

In Lacey U.S. Pat. No. 3,169,239, a combined plate and electrical receptacle has a circuit braker and indicator lamp added to the usual circuitry.

In A. Fleckenstein U.S Pat. No. 2,385,620, an electrical circuit contained in the plane of the cover plate is energized by resilent strips with curved lips perpendicular to slots, which lips enclose and contact the blades of plugs inserted through the slots into the receptacle holding the cover which energizes pilot lamps mounted on the surface of the plate.

My present device provides an improvement to these devices by providing a circuit for each prong and ground contact which automatically connect with modular elements when they are mounted in spaces provided in the plate. These modules can contain a number of different electrical circuits. An opening is provided in the front of the cover plate to permit the transmission or reception of either light or sound energy to the module for a number of sensor and alarm systems.

SUMMARY OF THE INVENTION

This device utilizes an electrified electrical outlet cover plate, which has flexible contacts which engage the prongs and ground pin of a plug inserted into the outlet holding the plate to energize the electrical circuits within the plate. These electrical circuits extend into open cavities on opposite ends of the plate each of which contain a module. Flexible contacts from the modules engage the circuit extensions to energize the modules. The plate is constructed in sandwich form having essentially flat electrical circuits energized by the plug prongs contained within two opposed insulated covers. These circuits are connected with the prongs and ground connector of a plug when the plug is inserted into the receptacle holding the plate. These circuits extend into the two identical cavities on each end of the plate. These cavities can each contain a module which has flexible external electrical contacts to contact each circuit which have external dimensions of slightly smaller size than the internal dimensions of the cavities. The contacts are arranged such that when the module is mounted within the chamber the respective flexible contacts will each engage one of the plate circuits which completes the circuit from each of the face plate circuits to the module. A hole in the outer surface of the plate adjacent to a module permits transmission of either light or acoustic energy to or from the module. Very large scale integrated circuitry now in existence and even more compact future circuitry under development will allow this relatively small volume to house a great number of circuits. The ease of installing and connecting different circuit elements to existing electrical outlets provides an extremely flexible yet inexpensive device which can be used not only in requirements using conventional circuit elements, such as indicator lights or varistor transient suppressors, but also for requirements where the detection or transmission of light, sound, or radio waves may be of value. Intruder detectors, smoke or fire detectors, intruder alarms, smoke or fire alarms and gas alarms are representative of the possible types of use with very large scale integrated circuits.

BRIEF DESCRIPTION OF THE DRAWINGS

FIG. 1 is an exploded isometric view of the individual parts of the invention oriented for attachment when rotated and translated as indicated by the dashed lines.

FIG. 2 is an isometric view of a lower module with three contacts showing the matching electrical connections to the plate.

FIG. 3 is a front view of the face of the plate taken along line 3—3 of FIG. 1.

FIG. 4 is a cross-section of FIG. 3 taken along line 4—4 of FIG. 3.

DESCRIPTION OF PREFERRED EMBODIMENTS

All descriptions as to location, orientation or rotation are given with respect to the drawings. Referring to FIG. 1, a modular electrified cover plate 10 is shown. The plate is made up of a front cover 12, a rear cover 14, electrical circuit elements 11, 15, and 16 and modules 18 and 20. Modules 18 and 20 each have two flexible contacts 19 which extend from the surface to a right angle bend toward the center of the plate to form a contact surface 21 which is essentially parallel with the face of the module.

Front cover 12 has two identical horizontal cavities 22 on its inner surface opposing rear cover 14 which are of the proper shape and size to contain modules 18 and 20. Circuit elements 11 and 16 are made up of a vertical electrical element 24 and two horizontal circuit elements 26 each having fingers 28 which are bent away from front cover 12. Fingers 28 have a specific location with respect to front cover 12 which will be described later. Circuit element 15 has a finger 13 adjacent a hole 17 and a finger 23 adjacent a hole 9 each of which are also bent away from front cover 12, a hole 8 in its center and extensions 6 and 7 each of which have a specific location with respect to cover 12 which will be described later. Front cover 12 has two identical narrow vertical recesses 30 which communicate with cavities 22 and also has four narrow horizontal recesses 32 which communicate respectively with both recess 30 and with two generally electrical receptacle shaped recesses 34 joined by a vertical recess 29. Recesses 34 are slightly larger than the dimensions of the receptacle area in a conventional wall outlet and have the same location with respect to cover plate 10 as the receptacles do when the plate is attached. A vertical recess 33 communicates with upper recess 34 and the center of upper cavity 22. A vertical recess 35 communicates with lower recess 34 and the center of lower cavity 22. Holes 36 in each recess 34 are of a proper size and location to receive the prongs and holes 38 in each recess 34 are of a proper size and location to receive the ground pin of an electrical plug. A centered mounting hole 40 in front cover 12 is of a proper size and location to permit mounting plate 10 on a conventional receptacle outlet using a proper size mounting screw. The outer dimensions of the face of front cover 12 are the same as the outer dimensions of a conventional cover plate.

Recesses 30 and 32 are of a proper depth, width, and location to contain the adjacent portions of circuit elements 11 and 16 with the orientation as shown. Recesses 33 and 35 are of a proper depth, width, and location to contain the adjacent portions of extensions 6 and 7 respectively with the orientation as shown. Recess 29 is of the proper depth, width, and location to contain the adjacent portion of electrical circuit element 15 with the orientation as shown. Modules 18 and 20 are sized to fit within the opposed adjacent respective cavities 22 with the orientation as shown. The length of circuit elements 11 and 16 is such that when they are mounted within their respective opposed recesses the ends of vertical circuit elements 24 will extend into horizontal chambers 22 a distance equal to at least one half of the height of the respective chamber.

The depth of horizontal cavities 22 is such that when modules 18 and 20 are contained within their respective opposed cavity 22 and circuit elements 11 and 16 are located within their respective opposed recesses 30 and 32 then contacts 21 which extend from modules 18 and 20 will press against the respective opposed ends of circuit elements 24. A rectangular opening 39 in front cover 12 adjacent to module 20 provides access through the front cover to or from the module for either light or acoustic signals.

Rear cover 14 has two identical vertical projections 42 in the inner surface opposing vertical recesses 30 in front cover 12 having outside lateral dimensions which are slightly less than the dimensions of vertical recesses 30. The depth of vertical recesses 30 is slightly greater than the depth of vertical circuit elements 24 plus the height of vertical projections 42 to accomodate both parts within the recess.

Rear cover 14 has two identical holes 37 which are of the same size and shape as recesses 34 and are located such that they are aligned with the recesses 34 when covers 12 and 14 are placed together. Rear cover 14 has a mounting hole 41 which is the same size as hole 40 in plate 12 and is located such that the two holes are aligned when the covers are placed together. Thus, upon mounting the cover plate 10 over a duplex wall outlet, the raised (i.e. with respect to the wall) plug receiving receptacle portions of the outlet mount through the openings 37.

When rear cover 14 and front cover 12 are placed together, the locations of projections 42 relative to vertical recesses 30 are such that the projections will fit within the slots.

Front cover 12 and rear cover 14 are made of a plastic material of a type that can be welded together using dielectric heating or equivalent techniques. When front cover 10 is welded to rear cover 14 projections 42 will be fused into vertical recesses 30 and the surfaces of the two covers will be sealed together. This will join the two covers 12 and 14 into a single sealed unit with modules 18 and 20 sealed inside and projections 21 pressing against the ends of vertical circuit elements 24.

A thyrister 44 is encapsulated within module 18 and is connected to the two contacts 19 of the module. A neon bulb 46 is encapsulated within module 20 and has one lead connected to a resistor 48. This series combination of neon bulb 46 and resistor 48 is connected to the two contacts 19 of module 20. Module 20 is transparent.

Referring to FIG. 2 a module 50 having two electrical contacts 19 and an additional electrical contact 52 can be seen. Module 50 has the same external dimensions as modules 18 and 20. Contacts 19 are the same on module 50 as on modules 18 and 20. A third electrical contact 51 is centered between and has the same dimensions and orientation as contacts 19 on module 50.

This figure represents the relationship between module 50 and the lower ends of circuit elements 7 and 24 if module 50 were substituted for module 20 in FIG. 1. This illustrates the means of connecting the three separate circuit elements of plate 10 to a module. Module 50 can be used on either end of plate 10 to provide a ground for the circuit in the module.

Referring to FIG. 3, the front view of cover plate 10 with all of the components in place can be seen. Fingers 28 of horizontal circuit elements 26 project slightly into their respective adjacent holes 36, such that the prongs of a plug inserted into holes 36 will make a sliding contact with these fingers. Fingers 13 and 23 of circuit element 15 extend into their respective adjacent holes 38 such that the ground contact of a plug inserted into either of holes 38 will make a sliding contact with these fingers. Opening 39 adjacent to module 20 will permit the light from neon bulb 46 to be seen through front cover 12 of cover plate 10.

Referring to FIG. 4 the relationship between module 18, recess 22, front cover 12 and back cover 14 can be seen. With front cover 12 and back cover 14 fused together module 18 is sealed within cover plate 10 in a waterproof environment.

Thyristor 44 shown in FIG. 1 in module 18 when connected as described above will clip electrical transient spikes to any electrical equipment which is plugged in through upper holes 36 to provide electrical protection against this type of electrical problem, since any equipment plugged into these holes will contact both the two live contacts in the receptacle and fingers 28 in respective holes 36 thereby connecting the thyristor to the circuit.

This plug will simultaneously energize neon bulb 46 and resistor 48. When the circuit is energized neon bulb 46 will glow, which can be observed through opening 39 to indicate both that the circuit is energized and that the plug is making contact with the receptacle thereby energizing the device connected to the plug. Likewise any plug inserted through lower holes 36 will energize both modules 18 and 20.

The circuits in modules 18 and 20 are merely illustrative of the fact that any suitable size desired circuit can be contained within these modules and be energized by a plug inserted into either receptacle.

This device can also be used with electrical outlets having either more or fewer electrical contacts such as three phase alternating current outlets or direct current outlets.

The provision of a module mounted in a reserved volume in plate with electrical energy provided to the module whenever a plug is inserted into the covered receptacle provides an inexpensive method of using large numbers of circuit types throughout any wired area with no wiring cost. The types of applications using modern micro processor very large scale circuitry and coupled with the use of miniature sensors or alarm systems can be very large. As examples, a noise detector could be mounted in the lower module having opening 39 incorporating a radio frequency transmitter which could either transmit an alarm over existing power line wiring or through the air. In such an application a plug alone could be inserted in the lower receptacle to provide energy to the module. If concealment were important the plug could be shaped and painted to resemble the receptacle opening itself.

The potential applications will increase as circuitry is made smaller and more complex. It is also feasible to use a number of detectors and transmitters with several modules to provide burglar alarm protection for an entire home, as an example.

Although specific construction of the herein disclosed cover plate has been shown and described, it is obvious that those skilled in the art may make various modifications and changes to them without departing from the scope and spirit of the present invention. It is to be expressly understood that the instant invention is limited only by the appended claims.

I claim:

1. A cover plate for an electrical wall outlet having at least one raised receptacle portion comprising:
    (a) a front cover member having a generally planar outer surface, a formed inner surface having at least two recessed channels and integrally joined edge walls extending out of the plane of said outer surface, said formed inner surface and said edge walls defining at least one compartment, said front cover member further having at least one pair of apertures extending through said outer surface centrally of a recess in said inner surface and spaced from one another to receive the prongs of an electrical plug when said plug is inserted through said front cover member and into said at least one raised receptacle portion of said wall outlet;
    (b) an electrical circuit containing module having electrical contacts thereon, said module dimensioned to fit within said compartment;
    (c) at least two conductive buses mounting in said recessed channels, each having a conductive finger thereon individually leading to one of said pair of apertures and mounting in resilient overlapped relation to said apertures so as to be displaced by and make electrical contact with the prongs of said plug when inserted therein, said buses further contacting said electrical contacts on said circuit module and completing an electrical current path to said circuit module when said plug is inserted into said receptacle portion of said wall outlet;
    (d) a generally planar rear cover member having at least one opening formed therethrough for receiving said raised receptacle portion of said wall outlet, said rear cover member mounting in abutting relation to said edge walls of said front cover member and holding said module and said conductive buses therebetween and said receptacle portions in alignment with said front cover member and apertures; and
    means for securing said cover plate to said wall outlet.

2. The cover plate as in claim 1 wherein said circuit containing module includes means for providing illumination and said front cover has at least one aperture abutting the outer surface of said module in alignment with said illumination means.

3. The cover plate as in claim 1 wherein said rear cover includes a formed inner surface having raised projections extending therefrom for mounting in mating relation to said recessed channels and said conductive buses.

4. The cover plate as in claim 1 wherein said circuit containing module includes a transient suppresser coupled to the electrical contacts thereof.

5. A cover plate for an electrical wall outlet having a pair of raised receptacle portions comprising:
    (a) a front cover member having a generally planar outer surface, a formed inner surface having a plurality of recesses channels and integrally joined edge walls extending out of the plane of said outer surface, said formed inner surface and said edge walls defining a plurality of compartments, said front cover member having first and second pairs of power apertures and first and second ground apertures extending through said outer surface centrally of first and second recesses in said inner surface, each of said respective first and second pair of power apertures and said first and second ground apertures being spaced from one another to receive the prongs of electrical plugs when inserted through said front cover member and into said pair of raised receptacle portions of said wall outlet;
    (b) a plurality of electrical circuit containing modules having a plurality of resilient electrical contacts thereon and each dimensioned to fit within one of said compartments;
    (c) at least one power, one neutral and one ground bus mounting in said recessed channels, each having two conductive fingers thereon individually leading to separate ones of said first and second pairs of apertures and said first and second ground apertures and mounting in resilient overlapped relation thereto so as to be displaced by and make electrical contact with the prongs of said plug when inserted therein, said buses further contacting said electrical contacts on said circuit modules and completing an electrical current path and ground path to said circuit modules when said plug is inserted into said receptacle portions of said wall outlet; and
    (d) a generally planar rear cover member for abutting said edge walls and having a pair of openings formed therethrough, for receiving said raised receptacle portions of said wall outlet, said rear cover member holding said modules and said conductive buses therebetween and said receptacle portions in abutting alignment with said front cover member and apertures; and
    (e) means independent of said plug for securing said cover plate to said wall outlet.

6. The cover plate as in claim 5 wherein said circuit containing module includes means for providing illumination and said front cover has at least one aperture abutting the outer surface of said module in alignment with said illumination means.

* * * * *